United States Patent [19]

Hirano et al.

[11] Patent Number: 4,545,003

[45] Date of Patent: Oct. 1, 1985

[54] PICK-UP DEVICE POSITIONING ARRANGEMENT IN AN INFORMATION DISC PLAYER

[75] Inventors: Hiroyuki Hirano; Toshihiko Kurihara; Taichi Akiba; Yositsugu Araki, all of Tokorozawa, Japan

[73] Assignee: Pioneer Electronic Corporation, Tokyo, Japan

[21] Appl. No.: 370,192

[22] Filed: Apr. 21, 1982

[30] Foreign Application Priority Data

Apr. 22, 1981 [JP] Japan .................................. 56-061004

[51] Int. Cl.$^4$ .......................... G11B 7/00; G11B 21/10
[52] U.S. Cl. ......................................... 369/43; 369/44
[58] Field of Search ........................ 369/43, 44, 45, 46; 250/202, 204

[56] References Cited

U.S. PATENT DOCUMENTS

| | | |
|---|---|---|
| 2,915,315 | 12/1959 | Rabinow . |
| 3,449,833 | 6/1969 | Dzula . |
| 3,688,410 | 9/1972 | Zeidler et al. . |
| 4,135,086 | 1/1979 | Baba . |
| 4,268,745 | 5/1981 | Okano .............................. 369/46 X |
| 4,318,142 | 3/1982 | Ravizza ............................ 360/70 X |
| 4,320,493 | 3/1982 | Kikuchi et al. . |
| 4,322,836 | 3/1982 | Kinjo et al. ........................... 369/43 |
| 4,338,682 | 7/1982 | Hosaka et al. .................... 369/46 X |
| 4,340,950 | 7/1982 | Kosaka ................................. 369/44 |

Primary Examiner—Aristotelis M. Psitos
Attorney, Agent, or Firm—Fleit, Jacobson, Cohn & Price

[57] ABSTRACT

An information reading and reproducing apparatus in which a recording disc having an information-carrying face formed with recorded tracks is to be driven for rotation and which includes drive means operative to drive a signal pick-up means for movement radially of the disc at a velocity controlled by a velocity control device and to produce signals indicative of the locations of the pick-up spot relative to the tracks on the disc in a radial direction of the disc, the velocity control device comprising velocity detecting means operative to extract from said signals information indicative of the velocity of movement of the signal pick-up means with respect to the disc.

14 Claims, 16 Drawing Figures

PICK-UP DEVICE POSITIONING ARRANGEMENT IN AN INFORMATION DISC PLAYER

FIELD OF THE INVENTION

The present invention relates in general to an audio and/or video disc information reading and reproducing apparatus such as an audio and/or video disc player of, for example, the optically or electrostatically scanned type. The present invention is, particularly, concerned with a device for controlling the velocity of movement of the pick-up unit of an audio and/or video disc information reading and reproducing apparatus with respect to a recorded track on an information-carrying face of an audio and/or video disc in the reading and reproducing apparatus.

BACKGROUND OF THE INVENTION

In an audio and/or video disc information reading and reproducing apparatus such as an audio and/or video disc player presently in use, audio and/or video information is stored on an audio and/or video disc in the form of frequency-modulated audio and/or video carriers superposed on one another or in the form of pulse code modulated signals as in the case of an audio disc. Such multiplex or pulse-coded information is recorded as a series of depressed areas or "pits" formed in an information-carrying face of the audio and/or video and arranged in a spiral recorded track or in a number of concentric recorded tracks about the center axis of the disc. In an information reading and reproducing apparatus of the optically-scanned type, the audio and-/or video information thus stored on the audio and/or video disc is read out by scanning the pits along a track on the disc with a beam of laser light and thereby detecting the lengths of and the spacings between the scanned pits. During playback of such an audio and/or video disc, the disc is driven for rotation about the center axis thereof usually at a fixed velocity with a beam of laser light emitted from an optical signal pick-up unit and focused on the target track on the rotating disc by means of tracking and focusing servos included in the pick-up unit. The beam of the light thus incident on the information-carrying face of the rotating audio and/or video disc is reflected therefrom or transmitted therethrough and is modulated by the audio and/or video signals represented by the pattern of the pits in the recorded track traced by the beam. The signals thus read out from the recorded track by the information pick-up beam are extracted from the beam and are converted into electric audio and/or video reproducing signals by means of a photoelectric transducer unit.

To enable the information pick-up beam to reach or search for a desired track of the disc or any predetermined position with respect to the disc being played back in an audio and/or video disc information reading and reproducing apparatus of the above described nature, the signal pick-up unit incorporated in the reading and reproducing apparatus is usually arranged to be movable radially of the audio and/or video disc. The signal pick-up unit of the information reading and reproducing apparatus is for this purpose mounted on a carriage provided with suitable drive means such as, typically, a reversible geared motor and suitable control means for controlling the velocity at which the pick-up unit is to be driven to move on the carriage by such drive means. The velocity control means is provided in the signal pick-up unit and is adapted to detect the output speed of the drive means and to produce an output signal in the form of a voltage variable with the detected output speed. The signal is compared with a reference signal represented by a predetermined voltage so as to produce an error signal corresponding to the difference between the voltages respectively representative of the signals compared with each other. A control signal is produced on the basis of this error signal and is fed back to the drive means for thereby controlling the output speed of the drive means.

Thus, the known velocity control means for the signal pick-up unit of a audio and/or video disc information reading and reproducing apparatus has included therein a velocity detecting device such as, for example, a tachometric generator or a frequency generator to detect the output speed of the drive means for the pick-up unit. Provision of such a detecting device in the signal pick-up unit not only results in an increased production cost of the information reading and reproducing apparatus as a whole but makes it difficult to construct the pick-up unit compactly with use of, for example, a semiconductor laser emitter in the pick-up unit.

It is, accordingly, a prime object of the present invention to provide an audio and/or video disc information reading and reproducing apparatus having an improved velocity control device having compact and small-sized construction and yet capable of reliably controlling the output speed of the drive means for the signal pick-up unit of the reading and reproducing apparatus.

It is another object of the present invention to provide an audio and/or video disc information reading and reproducing apparatus featuring a velocity control device capable of detecting the output speed of the drive means for the signal pick-up unit of the reading and reproducing apparatus without using a tachometric generator, a frequency generator or any other form of such a detecting device having unwieldy construction which may give rise to an increase in the production cost of the apparatus as a whole.

SUMMARY OF THE INVENTION

In accordance with the present invention, there is provided a velocity control device for an information reading and reproducing apparatus in which a recording disc having an information-carrying face formed with recorded tracks is to be driven for rotation about the center axis of the disc and which includes drive means operative to drive the signal pick-up means for movement radially of the disc at a velocity controlled by the velocity control device and to produce signals indicative of the locations of the tracks on the disc in a radial direction of the disc, comprising velocity detecting means operative to extract from the signals information indicative of the velocity of movement of the signal pick-up means with respect to the disc. The signals produced by the signal pick-up means include a radio-frequency signal produced by an information pick-up spot tracing a recorded track on the information-carrying face of the disc and continuously variable in magnitude as the information pick-up spot is displaced radially of the information-carrying face. In this instance, the velocity detecting means of the device according to the present invention may be arranged to be operative to produce as the above mentioned information an envelope signal indicative of the envelope of the radio-frequency signal. The signals produced by the signal pick-up means may further include a tracking error signal indicative of an amount of deviation of the information pick-up spot from a recorded track on the disc in a radial direction of the disc and the direction of movement of the signal pick-up means with respect to the disc. In this instance, the velocity detecting means of the device according to the present invention may be arranged to be operative to produce the tracking error signal as the above mentioned information.

Where the information reading and reproducing apparatus to which the present invention appertains is of the optically scanning type, the above mentioned information pick-up spot is provided by a spot at which an information pick-up beam of, for example, laser light is incident on the information-carrying face of the audio and/or video disc.

BRIEF DESCRIPTION OF THE DRAWINGS

The features and advantages of a velocity control device according to the present invention will be more clearly appreciated from the following description taken in conjunction with the accompanying drawings in which.

DESCRIPTION OF THE PREFERRED EMBODIMENTS

Figure 1:
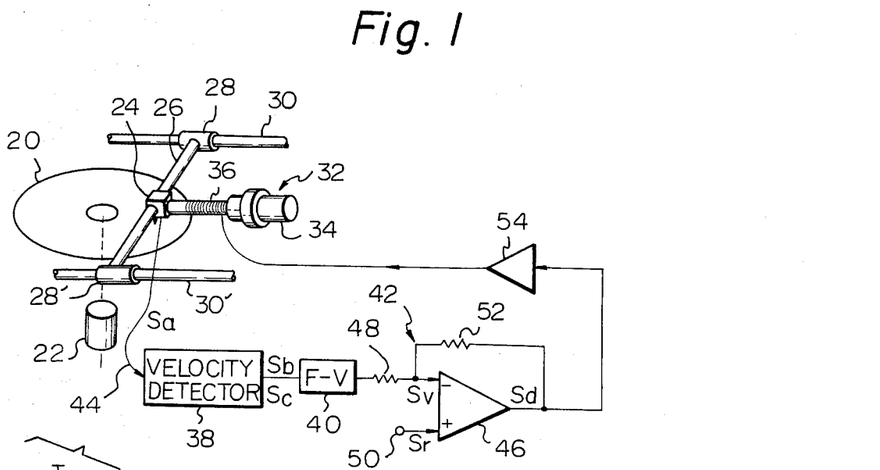
FIG. 1 is a block diagram showing a preferred embodiment of the present invention as realized in an audio and/or video disc information reading and reproducing apparatus which is in part shown in a perspective view.

Referring to FIG. 1 of the drawings, an information reading and reproducing apparatus including a velocity control device embodying the present invention is adapted to playback an audio and/or video disc whicn is herein assumed, for convenience sake, as being a video disc 20. Though not shown in the drawings, the video disc 20 has an information-carrying face formed with recorded tracks extending spirally or concentrically about the center axis of the video disc 20 and is mounted on a suitable rotary carriage member such as a turntable or a flange member secured to a drive spindle. The drive spindle is coupled to the output shaft of a drive unit such as a d.c. servo motor 22 so that the video disc 20 is driven for rotation about the center axis thereof when the servo motor 22 is in operation. The velocity control device embodying the present invention is shown comprising a signal pick-up unit 24 mounted on a carriage bar 26 having a pair of slider elements 28 and 28' which are spaced apart in parallel from each other. The slider elements 28 and 28' are slidable on stationary guide bars 30 and 30', respectively, which are securely supported each at both axial ends thereof on a suitable frame structure (not shown) of the audio and/or video disc information reading and reproducing apparatus. The guide bars 30 and 30' extend substantially in parallel from each other on a plane parallel with the plane on which the video disc 20 is rotatable about the center axis thereof so that the signal pick-up unit 24 is linearly movable along a predetermined path perpendicularly toward and away from an extension of the center axis of the video disc 20. Thus, the slider elements 28 and 28' and the guide bars 30 and 30' constitute guide means for guiding the signal pick-up unit 24 to move along the predetermined path with respect to the video disc 20 in the information reading and reproducing apparatus. The described construction and arrangement of the guide means is simply for the purpose of illustration and may thus be modified and/or changed if and as desired. The signal pick-up unit 24 is herein assumed, by way of example, as being of the optinal type using a semiconductor laser emitter.

The information reading and reproducing apparatus shown in FIG. 1 further comprises drive means operative to drive the signal pick-up unit 24 for movement along the above mentioned predetermined path with respect to the video disc 20. In the information reading and reproducing apparatus herein shown, the drive means comprises an electromagnetic linear-motion drive assembly 32 which consists essentially of a stationary field magnet unit 34 fixedly held in position with respect to the above mentionec frame structure of the reading and reproducing apparatus and a movable armature unit 36 composed of a plunger and a current-carrying coil helically wound on the plunger. The plunger of the movable armature unit 36 has an end portion axially extending in the stationary field magnet unit 34 and is securely coupled to the signal pick-up unit 24 at the other axial end thereof. The armature unit 36 is thus longitudinally movable in opposite directions with respect to the stationary field magnet unit 34 and as a consequence the signal pick-up unit 24 coupled to the armature unit 36 is movable back and forth with respect to the video disc 20 in the reading and reproducing apparatus by the interaction between the constant magnetic field established by the field magnet unit 34 and a variable control field induced by a current supplied to the current-carrying coil of the armature unit 36. The construction and arrangement of the drive means as above described is also simply for the purpose of illustration and may therefore be modified and/or changed arbitarily insofar as the drive means has an electromagnetic induction element such as a current-carrying coil adapted to produce a magnetomotive force which is proportional to or otherwise continuously variable with a current fec to the induction element and which has a direction dictated by the polarity of the current. The linear-motion drive assembly 32 constituting the drive means may therefore be substituted by a motor of the rotary type.

In the audio and/or video disc information reading and reproducing apparatus thus constructed and arranged generally, a velocity control device is provided to regulate the intensity and the polarity of the current to be supplied to the current-carrying coil of the movable armature unit 36 of the linear-motion drive assembly 32. In accordance with the present invention, such a velocity control device comprises a velocity detecting circuit 38, a frequency-to-voltage converter circuit 40 (F-V) and a subtractive comparator circuit 42 which are electrically connected in series between the signal pick-up unit 24 and the armature unit 36 of the linear-motion drive assembly 32. The velocity detecting circuit 38 has an input terminal connected to the signal pick-up unit 24 by a line 44 and an output terminal connected to the input terminal of the frequency-to-voltage converter circuit 40. The subtractive comparator circuit 42 comprises an operational amplifier 46 hlving a negative input terminal connected to the output terminal of the frequency-to-voltage converter circuit 40 through a resistor 48 and a positive input terminal connected to a suitable source 50 of a reference signal $S_r$ in the form of a positive voltage $E_r$ representative of a predetermined velocity at which the signal pick-up unit 24 is to be driven to move radially of the video disc 20. The subtractive comparator circuit 42 further comprises a feedback resistor 52 intervening between the output terminal and the negative input terminal of the operational amplifier 46 as shown. The output terminal of the operational amplifier 46 is connected through a driving amplifier 54 to the current-carrying coil of the linear-motion drive assembly 32 through a line 56 as shown. In the velocity control device thus constructed, the velocity detecting circuit 38 electrically connected to the signal pick-up unit 24 is adapted to detect the velocity of movement of the signal pick-up unit 24 with respect to the video disc 20 on the basis of a signal produced in a tracking servo system (not shown) which is usually incorporated in the signal pick-up unit 24 driven for movement with respect to the video disc 20 by means of the above described linear-motion drive assembly 32.

Figure 2:
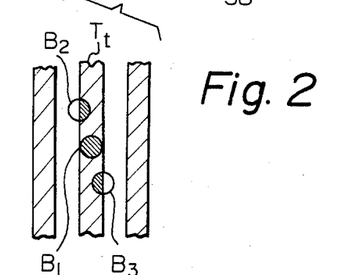
FIG. 2 is a schematic view showing an example of the relationship among the focused spots of an information pick-up and error detecting beams radiated toward recorded tracks on an information-carrying face of a video and/or audio disc from a tracking servo system included in the signal pick-up unit of the audio and/or video disc information reading and reproducing apparatus shown in FIG. 1.

As well known in the art, the tracking servo system provided in a audio and/or video disc information reading and reproducing apparatus is adapted to detect the location of the point or spot at which the information pick-up beam following a target track of the video disc is incident on the video disc and to precisely control the position of the signal pick-up unit from which the information pick-up beam is directed toward the target track during playback operation of the reading and reproducing apparatus, as is well known in the art. For this purpose, two error detecting beams of light as well as the information pick-up beam of light are radiated from the signal pick-up unit onto the information-carrying face of the video disc being played back. The total of three beams of light thus consisting of the information pick-up beam and the two error detecting beams are focused at points or spots located in predetermined relationship to each other on the information-carrying face of the video disc. FIG. 2 of the drawings shows an example of such a relationship among the respective focused spots of the three beams. In FIG. 2, the focused spot of the information pick-up beam is denoted by $B_1$ while the focused spots of the error detecting beams are denoted by $B_2$ and $B_3$, respectively. The three beams of light are directed toward a target track $T_t$ so that the respective areas over which the focused spots $B_2$ and $B_3$ of the two error detecting beams overlap the target track $T_t$ are substantially complementary to each other. When the focused spot $B_1$ of the information pick-up beam is correctly located on the target track $T_t$ of the video disc, therefore, the focused spot of one of the error detecting beams overlaps the target track $T_t$ over one half of the total area of the spot and the focused spot of the other the error detecting beam overlaps the target track $T_t$ over the other half of the total area of the spot as shown. The tracking servo system incorporated in the signal pick-up unit thus comprises, in addition to means to emit the above mentioned information pick-up and error detecting beams, photoelectric transducer elements (not shown) which are operative to produce output signals continuously variable in magnitude with the areas over which the focused spots $B_1$, $B_2$ and $B_3$, respectively, of the information pick-up and error detecting beams overlap the target track $T_t$. A tracking error signal is produced through detection of the difference between the levels of the signals produced by the transducer elements responsive to the focused spots $B_2$ and $B_3$, respectively, of the error detecting beams. Such an error signal is produced by a suitable subtractive comparator circuit supplied with the signals produced by these transducer elements and assumes a zero value when the focussed spots $B_2$ and $B_3$ of the error detecting beams are located symmetrically with respect to the target track $T_t$ with the focussed spot $B_1$ of the information pick-up beam located correctly on the target track $T_t$ as shown in FIG. 2. When the focused spot $B_1$ of the information pick-up beam is thus located correctly with respect to the target track $T_t$, the reproducing signal extracted from the pick-up beam reflected from or transmitted through the information-carrying face of the video disc has a peak level in absolute value.

Figures 3A, 3B, 3C:
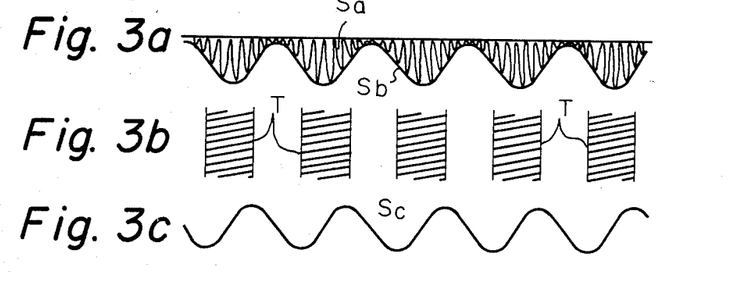
FIG. 3a is a view showing the waveform of a radio-frequency signal resulting from the information pick-up beam with which the recorded tracks on the information-carrying face of the video and/or audio disc is scanned.
FIG. 3b is a schematic plan view showing portions of the recorded tracks on the information-carrying face of the video and/or audio disc.
FIG. 3c is a view showing the waveform of a tracking error signal resulting from the error detecting beams incident on the recorded tracks on the information-carrying face of the video and/or audio disc.

If the information pick-up beam directed at the information-carrying face of the video disc is displaced radially of the video disc toward or away from an extension of the center axis of the disc, the photoelectric transducer element responsive to the information pick-up beam reflected from or transmitted through the video disc as above described produces a radio-frequency signal $S_a$ having an envelope b with a sinusoidal waveform as indicated in FIG. 3a. of the drawings as the focused spot $B_1$ of the information pick-up beam perpendicularly crosses the tracks T shown in FIG. 3b. On the other hand, the above mentioned subtractive comparator circuit supplied with the signals respectively produced by the photoelectric transducer elements responsive to the error detecting beams reflected from or transmitted through the video disc produces a tracking error signal $S_c$ which also has a sinusoidal waveform as shown in FIG. 3c of the drawings as the focused spots $B_2$ and $B_3$ of the error detecting beams are displaced perpendicularly to the tracks T while maintaining the above mentioned predetermined relationship between the focused spots $B_1$, $B_2$ and $B_3$. Thus, the amplitude of the tracking error signal $S_c$ is indicative of the amount of deviation of the focused spot $B_1$ of the information pick-up beam from each of the recorded tracks T and the polarity of the signal is indicative of the direction in which the focused spot $B_1$ is deviated from each of the tracks T. During playback operation of the audio and-/or video disc information reading and reproducing apparatus, the tracking error signal $S_c$ produced as above described is used to control the position of the signal pick-up unit from which the information pick-up beam is to be radiated toward the target track $T_t$ of the rotating video disc.

Figure 4:
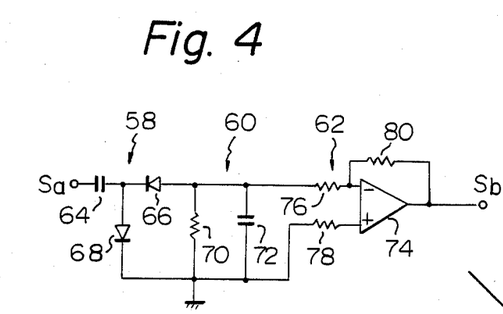
FIG. 4 is a diagram showing a preferred example of an envelope extraction network which may form part of the velocity control device shown in FIG. 1.

In the embodiment of the present invention as shown in FIG. 1, the velocity detecting circuit 38 is supplied with either the radio-frequency signal $S_a$ produced from the information pick-up beam or the tracking error signal $S_c$ produced from the error detecting beams thus radiated from the signal pick-up unit 24 onto the information-carrying face of the video disc 20. If, in this instance, the radio-frequency signal $S_a$ is supplied to the velocity detecting circuit 38, the velocity detecting circuit 38 has incorporated therein a suitable envelope extraction network adapted to produce an envelope signal $S_b$ indicative of the envelope b of the radio-frequency signal $S_a$ (FIG. 3a). Each of the envelope signal $S_b$ and the tracking error signal $S_c$ thus fed to the velocity detecting circuit 38 has a frequency proportional to or otherwise continuously variable with the velocity at which the recorded tracks T (FIG. 3b) are scanned by the information pick-up beam in a direction transverse to the tracks, viz., the absolute value of the velocity at which the signal pick-up unit 24 (FIG. 1) is driven to move radially of the video disc 20. This is because of the fact that the individual recorded tracks on a information-carrying face of a video disc 20 are spaced apart at strictly equal intervals from each other in radial direction of the disc. FIG. 4 of the drawings shows a preferred example of the above mentioned envelope extraction network to produce the envelope signal $S_b$ from the radio-frequency signal $S_a$. As shown, the envelope extraction network largely consists of a demodulation and rectification circuit 58, a smoother circuit 60 and an amplifier circuit 62. The demodutation and rectification circuit 58 comprises a capacitor 64, and a parallel combination of diodes 66 and 68. One electrode of the capacitor 64 is connected to the output terminal of the previously mentioned photoelectric transducer element (not shown) responsive to the information pick-up beam reflected from or transmitted through the video disc 20 and is thus supplied with the radio-frequency signal $S_a$ from the transducer element. The other electrode of the capacitor 64 is connected to the cathode terminal of the diode 66 and the anode terminal of the diode 68. The diodes 66 and 68 are connected in parallel to the smoother circuit 60. The smoother circuit 60 is composed of a parallel combination of a resistor 70 and a capacitor 72 and is connected between the anode terminal of the diode 66 and the cathode terminal of the diode 68. On the other hand, the amplifier circuit 62 comprises an operational amplifier 74 having negative and positive input terminals connected in parallel to the smoother circuit and to the anode and cathode terminals of the diodes 66 and 68 through resistors 76 and 78, respectively. The amplifier circuit 62 further comprises a feedback resistor 80 connected between the output terminal and the negative input terminal of the operational amplifier 74 as shown and is adapted to produce the envelope signal $S_b$ at the output terminal thereof.

Figure 5:
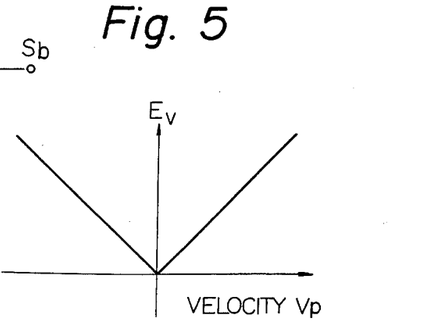
FIG. 5 is a graph showing the control characteristic achieved by the velocity control device shown in FIG. 1.

In the circuit arrangement of the velocity control device shown in FIG. 1, the velocity detecting circuit 38 is thus operative to produce either the envelope signal $S_b$ indicative of the envelope b of the radio-frequency signal $S_a$ shown in FIG. 3a or the tracking error signal $S_c$ shown in FIG. 3c when the information pick-up beam is displaced radially of the video disc 20 with the previously mentioned predetermined relationship maintained among the focused spots $B_1$, $B_2$ and $B_3$ of the information pick-up and error detecting beams, respectively. The signal $S_b$ or $S_c$ thus delivered from the output terminal of the velocity detecting circuit 38 is fed to the frequency-to-voltage converter circuit 40 and is converted into a signal $S_v$ in the form of a voltage $E_v$ continuously variable with the frequency of the input signal $S_b$ or $S_c$, viz., with the absolute value of the velocity $V_p$ at which the signal pick-up unit 24 is driven to move radially of the video disc 20 as will be seen from the graph of FIG. 5. The voltage signal $S_v$ is supplied to the negative input terminal of the operational amplifier circuit 46 of the subtractive comparator circuit 42 through the resistor 48 and is compared with the reference signal $S_r$ representative of the predetermined voltage $E_r$. The subtractive comparator circuit 42 is operative to produce an output signal $S_d$ in the form of a positive or negative voltage substantially equal to the difference between the voltages $E_v$ and $E_r$ respectively represented by the input signals $S_v$ and $S_r$, viz., the difference between the detected and predetermined velocities of movement of the signal pick-up unit 24. The signal $S_d$ thus delivered from the operational amplifier circuit 46 of the subtractive comparator circuit 42 is, upon amplification by the driving amplifier 54, supplied to the current-carrying coil of the movable armature unit 36 of the linear-motion drive assembly 32 and actuates the drive assembly 34 to drive the signal pick-up unit 24 for movement at a velocity and in a direction to diminish the difference between the detected and predetermined velocities of movement of the pick-up unit 24 with respect to the video disc 20 being scanned by the pick-up unit 24. In order to enable the armature unit 36 to move selectively in opposite directions with respect to the stationary field magnet unit 34, an inverter circuit may be provided at the output terminal of the subtractive comparator circuit 42 so that the positive or negative output voltage delivered from the operational amplifier circuit 46 of the subtractive comparator circuit 42 as above described is passed to the current-carrying coil of the armature unit 36 selectively through or in shunt across the inverter circuit depending upon the polarity of the input voltage supplied to the inverter circuit.

In the meantime, it is well known in the art that an audio and/or video disc has a certain degree of eccentricity which usually ranges from about 50 μm to about 100 μm. By reason of such eccentricity of an audio and/or video disc, the tracks of the disc slightly deviate from proper locations with respect to the signal pick-up unit 24. It therefore follows that, in the arrangement shown in FIG. 2, the target track $T_t$ on the disc to be radially scanned by an information pick-up beam passes through the focused spot $B_1$ of the beam toward the outer perimeter of the disc during one half of each full turn of the disc and toward the inner perimeter of the disc during the other half of the turn. In this instance, the velocity $V_t$ (μm/sec) at which the target track $T_t$ is displaced with respect to the focused spot $B_1$ of the information pick-up beam is given by $$V_t \approx |2\pi a N \sin \alpha|$$

where $a$ is the amount of eccentricity of the video disc in μm, N is the speed of rotation of the disc in rpm, and $\alpha$ is the angle which the line joining the center axis of the disc and the center point of the focused spot $B_1$ of the information pick-up beam makes with respect to the line joining the center axis and the axis of rotation of the disc.

Figure 6:
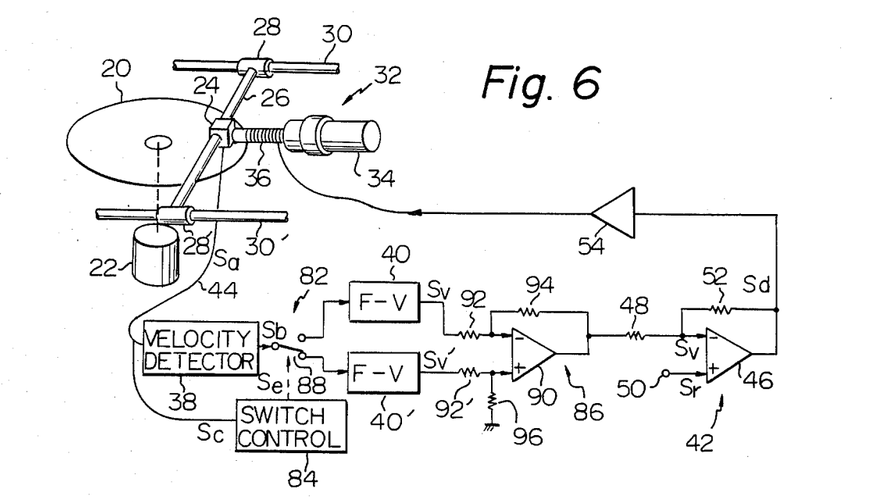
FIG. 6 is a view similar to FIG. 1 but shows another preferred embodiment of the velocity control device according to the present invention.

When, now, the signal pick-up unit 24 (FIG. 1) is actuated to start to move with respect to the disc at a controlled velocity, it may happen due to the above mentioned eccentricity of the disc that the target track to be crosswise scanned by the information pick-up beam passes through the focused spot $B_1$ (FIG. 2) of the information pick-up beam at a velocity higher than the desired velocity and in a direction opposite to the direction in which the pick-up unit 24 is to be moved with respect to the disc. If the velocity of movement of the signal pick-up unit 24 with respect to the disc is controlled under these conditions in the manners hereinbefore described with reference to FIGS. 1 and 5, the pick-up unit 24 would be moved in a direction opposite to the proper direction of movement with respect to the disc since the output signal $S_v$ produced by the frequency-to-voltage converter circuit 40 of the velocity control device shown in FIG. 1 is indicative of the velocity of movement of the pick-up unit 24 without respect to the direction of movement of the pick-up unit 24 as will be seen from the control characteristic indicated in FIG. 5. A problem is thus encountered in the embodiment of the present invention as described with reference to FIG. 1 in that the velocity at which the signal pick-up unit 24 is to be driven to move with respect to the disc can not be made higher than the maximum value of the velocity $V_t$ at which the target track $T_t$ is to be displaced with respect to the focused spot $B_1$ of the information pick-up beam due to the eccentricity of the disc and external disturbances which may act on the pick-up unit 24 and the linear-motion drive assembly 32. FIG. 6 of the drawings shows a second preferred embodiment of the present invention to eliminate such a problem.

Referring to FIG. 6, the second preferred embodiment of the present invention is constructed as a modification of the embodiment shown in FIG. 1 and comprises, in addition to a velocity detecting circuit 38 and a subtractive comparator circuit 42, switch means 82, a switch control circuit 84, first and second frequency-to-voltage converter circuits 40 and 40' (F-V), and a differential amplifier circuit 86. The velocity detecting circuit 38 is constructed similarly to its counterpart in the embodiment of FIG. 1 and is adapted to produce the previously mentioned envelope signal $S_b$ indicative of the envelope b of the radio-frequency signal $S_a$ shown in FIG. 3a when the information pick-up beam is displaced radially of the video disc 20 with the previously mentioned predetermined relationship maintained among the focused spots $B_1$, $B_2$ and $B_3$ of the information pick-up and error detecting beams, respectively. The velocity detecting circuit 38 has an input terminal electrically connected by a line 44 to the signal pick-up unit 24 and an output terminal connected to the respective input terminals of the first and second frequency-to-voltage converter circuits 40 and 40' across the switch means 82. The switch means 82 comprises a switch element 88 which is movable between a position providing connection between the output terminal of the velocity detecting circuit 38 and the input terminal of the first frequency-to-voltage converter circuit 40 and a position providing connection between the output terminal of the velocity detecting circuit 38 and the input terminal of the second frequency-to-voltage converter circuit 40' as shown. The motion of the switch element 88 between these two positions thereof is controlled by the switch control circuit 84 which is adapted to detect the direction in which the signal pick-up unit 24 is being moved radially of the video disc 20, viz., toward or away from the center axis of the video disc 20. For this purpose, the switch control circuit 84 has input terminals respectively connected to the output terminal of the velocity detecting circuit 38 and through the line 44 to the signal pick-up unit 24 and is responsive to the envelope signal $S_b$ delivered from the velocity detecting circuit 38 and the tracking error signal $S_c$ delivered from the signal pick-up unit 24. The switch control circuit 84 is operative to detect the points at which the voltage represented by the tracking error signal $S_c$ assumes the zero level. As will be seen from FIGS. 3a, 3b and 3c, such zero points consist of first zero points which occur when the focused spot $B_1$ of the information pick-up beam is located correctly on a recorded track on the disc, and second zero points which occur when the focused spot $B_1$ of the information pick-up beam is located accurately between adjacent two recorded tracks on the disc being scanned. The switch control circuit 84 is thus further operative to detect the polarity of the voltage represented by the tracking error signal $S_c$ in the vicinity of either each of the first zero points or each of the second zero points and to thereby produce an output signal $S_e$ indicative of the direction in which the signal pick-up unit 24 is being moved with respect to the disc. The switch element 88 of the switch means 82 is responsive to the signal $S_e$ thus delivered from the switch control circuit 84 and is moved into the position providing connection from the velocity detecting circuit 38 to the first frequency-to-voltage converter circuit 40 when the signal $S_e$ is indicative of one direction of movement of the signal pick-up unit 24 with respect to the video disc 20 and the position providing connection from the velocity detecting circuit 38 to the second frequency-to-voltage converter circuit 40' when the signal $S_e$ is indicative of the other direction of movement of the signal pick-up unit 24 with respect to the disc 20.

On the other hand, the differential amplifier circuit 86 serves as polarity discriminating means and comprises an operational amplifier circuit 90 having negative and positive input terminals connected to the output terminals of the first and second frequency-to-voltage converter circuits 40 and 40' through resistors 92 and 92', respectively, a feedback resistor 94 connected between the output terminal and the negative input terminal of the operational amplifier circuit 90, and a ground resistor 96 connected between the positive input terminal of the operational amplifier circuit 90 and ground as shown. The output terminal of the differential amplifier circuit 86 thus constructed and arranged is connected to the subtractive comparator circuit 42. The subtractive comparator circuit 42 has a negative input terminal connected to the output terminal of the operational amplifier circuit 90 of the differential amplifier circuit 86 through a resistor 48 and a positive input terminal connected to a suitable source 50 of a reference signal $S_r$ in the form of a positive voltage $E_r$ representative of a predetermined velocity at which the signal pick-up unit 24 is to be driven to move radially of the video disc 20. The subtractive comparator circuit 42 further comprises a feedback resistor 52 intervening between the output terminal and the negative input terminal of the operational amplifier 46 as shown. The output terminal of the operational amplifier 46 is connected through a driving amplifier 54 to the current-carrying coil of the linear-motion drive assembly 32 through a line 56 as shown.

Figure 7:
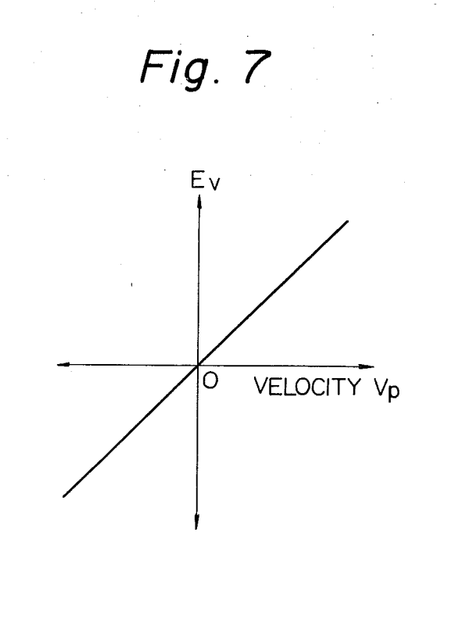
FIG. 7 is a graph showing the control characteristic achieved by the velocity control device shown in FIG. 6.

In the velocity control device thus constructed and arranged, the envelope signal $S_b$ delivered from the velocity detecting circuit 38 is fed to the first frequency-to-voltage converter circuit 40 or the second frequency-to-voltage converter circuit 40' depending upon the direction of movement of the signal pick-up unit 24 with respect to the video disc 20 as detected by the switch control circuit 84 in response to the envelope signal $S_b$ delivered from the velocity detecting circuit 38 and the tracking error signal $S_c$ supplied from the signal pick-up unit 24 as described above. The first frequency-to-voltage converter circuit 40 or the second frequency-to-voltage converter circuit 40' is thus operative to convert the input signal $S_b$ into a signal $S_v$ or $S_v'$ in the form of a voltage $E_v$ or $-E_v$, respectively, which is continuously variable with the frequency of the input signal $S_b$, viz., with the velocity $V_p$ at which the signal pick-up unit 24 is driven to move radially of the video disc 20 as will be seen from the graph of FIG. 7. The voltage signal $S_v$ or $S_v'$ is supplied via the differential amplifier circuit 86 to the negative input terminal of the operational amplifier circuit 46 of the subtractive comparator circuit 42 through the resistor 48 and is compared with the reference signal $S_r$ representative of the predetermined voltage $E_r$. The subtractive comparator circuit 42 is thus operative to produce an output signal $S_d$ in the form of a positive or negative voltage substantially equal to the difference between the voltage $E_v$ or $-E_v$ respectively represented by the signal $S_v$ or $S_v'$ and the voltage $E_r$ represented by the signal $S_r$, viz., to the difference between the detected and predetermined velocities of movement of the signal pick-up unit 24. The signal $S_d$ thus delivered from the operational amplifier circuit 46 of the subtractive comparator circuit 42 is, upon amplification by the driving amplifier 54, supplied to the current-carrying coil of the movable armature unit 36 of the linear-motion drive assembly 32 and actuates the drive assembly 34 to drive the signal pick-up unit 24 for movement at a velocity and in a direction to diminish the difference between the detected and predetermined velocities of movement of the pick-up unit 24 with respect to the video disc 20 being scanned by the pick-up unit 24. An inverter circuit may be provided at the output terminal of the subtractive comparator circuit 42 so that the positive or negative output voltage delivered from the operational amplifier circuit 46 of the subtractive comparator circuit 42 as above described is passed to the current-carrying coil of the armature unit 36 selectively through or in shunt across the inverter circuit depending upon the polarity of the input voltage supplied to the inverter.

Figure 8:
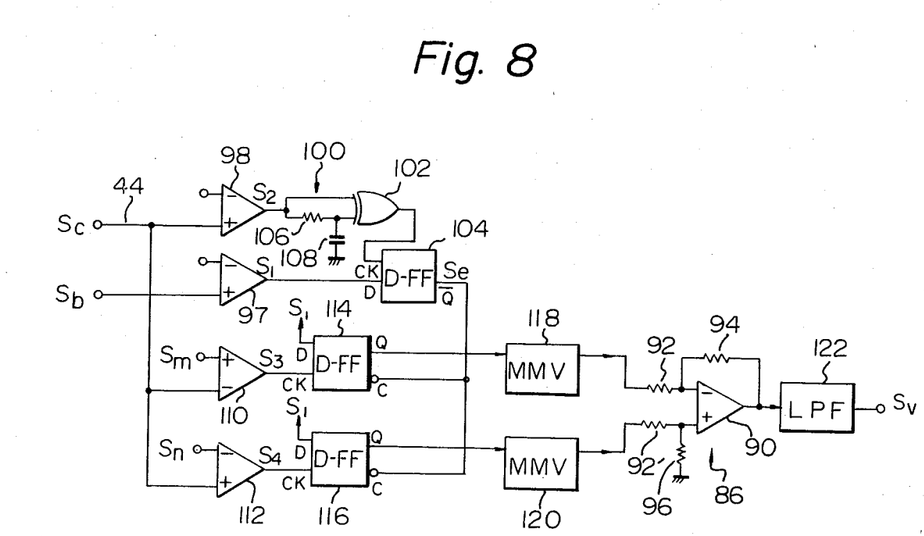
FIG. 8 is a schematic diagram showing a preferred example of the circuit arrangement consrituting the embodiment of FIG. 6.
Figure 9:
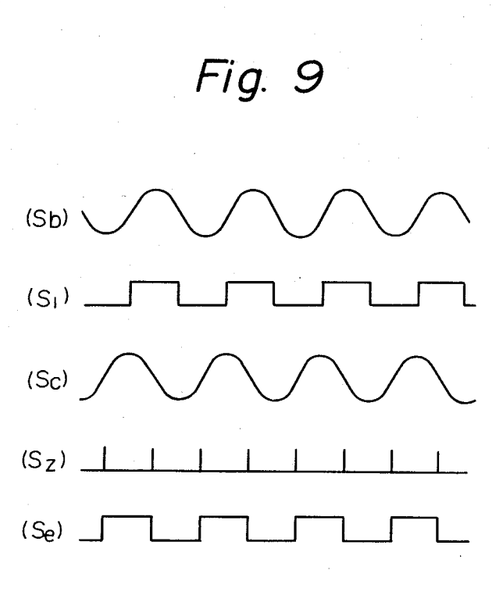
FIG. 9 is a graph showing waveforms of signals produced in the circuit arrangement shown in FIG. 8.

FIG. 8 of the drawings shows a preferred example of the logic circuit arrangement constituting the velocity control device described with reference to FIG. 6. In the circuit arrangement shown in FIG. 8, the switch control circuit 84 is composed of first and second comparator circuits 97 and 98 each having positive and negative input terminals, a differentiating circuit 100, a two-input exclusive "OR" gate circuit 102, and a delayed flip-flop circuit 104 (D-FF) having clock and data input terminals. The first comparator circuit 97 has its negative input terminal grounded or otherwise connected to a suitable source of a zero voltage $E_o$ and its negative input terminal connected to the output terminal of the hereinbefore described velocity detecting circuit 38 (FIG. 6) so as to be supplied with the envelope signal $S_b$. The first comparator circuit 97 is operative to compare the envelope signal $S_b$ with the zero voltage signal $E_o$ and to produce a train of pulse signals $S_1$ of a logic "1" level as indicated in FIG. 9 when, for example, the voltage represented by the envelope signal $S_b$ is higher in magnitude than a zero volt level. The pulse signals $S_1$ thus indicate whether the center point of the focused spot $B_1$ of the information pick-up beam is located on or between the recorded tracks on the video disc 20 being scanned by the information pick-up beam. On the other hand, the second comparator circuit 98 has its negative input terminal also grounded or otherwise connected to a suitable source of zero voltage $E_o$ and its positive input terminal connected to the signal pick-up unit 24 (FIG. 6) through the line 44 so as to be supplied with the tracking error signal $S_c$. The second comparator circuit 98 is thus operative to compare the tracking error signal $S_b$ (FIG. 9) with the zero voltage signal $E_o$ and to produce a train of pulse signals $S_2$ of a logic "1" level when, for example, the voltage represented by the tracking error signal signal $S_c$ is higher in magnitude than a zero volt level. Furthermore, the differentiating circuit 100 is composed of the parallel combination of a resistor 106 and a capacitor 108 and has an input terminal connected to the output terminal of the second comparator circuit 98 and an output terminal connected to one input terminal of the exclusive "OR" gate circuit 102. The differentiating circuit 100 is thus operative to detect the leading and trailing edges of the output pulse signals $S_2$ of the comparator circuit 98 by differentiating the voltages of the signals $S_2$ with respect to time and thereby supply the exclusive "OR" gate circuit 102 with pulses with pulsewidths indicative of the duration of the detected leading and trailing edges of the signals $S_2$. The exclusive "OR" gate circuit 102 having one input terminal thus connected in parallel with the differentiating circuit 100 to the output terminal of the differentiating circuit 100 has the other input terminal connected to the output terminal of the second comparator circuit 98 and is thus operative to produce impulse signals $S_z$ synchronized with the leading and trailing edges of the pulse signals $S_2$ delivered from the second comparator circuit 98, viz., at timings at which the tracking error signal $S_c$ assumes the zero volt level as will be seen from FIG. 9. The second comparator circuit 98, differentiating circuit 100 and exclusive "OR" gate circuit 102 thus constitute in combination zeropoint detecting means to detect the zero points of the tracking error signal $S_c$. The delayed flip-flop circuit 104 has its clock terminal (CK) connected to the output terminal of the exclusive "OR" gate circuit 102 and its data input terminal (D) connected to the output terminal of the first comparator circuit 96 and is operative to produce at its inverted output terminal $\overline{Q}$ an output signal as the previously mentioned signal $S_e$ from the switch control circuit 84 in the circuit arrangement at predetermined retarded timings in response to signal pulses supplied from the first comparator circuit 96 as will also be seen from FIG. 9. The signal $S_e$ thus appearing at the inverted output terminal $\overline{Q}$ thereof has a logic "0" level when the center point of the focused spot $B_1$ (FIG. 2) of the information pick-up beam being displaced radially of the video disc 20 is located between center point of a certain recorded track and the center point between the particular recorded track and one of the adjacent two recorded tracks on the disc and a logic "1" level when the center point of the focused spot $B_1$ of the information pick-up beam is located between the center point of the certain recorded track and the center point between the other adjacent recorded track on the disc.

The switch control circuit 84 in the logic circuit arrangement illustrated in FIG. 8 further comprises third and fourth comparator circuits 110 and 112 each having negative and positive input terminals. The positive input terminal of the third comparator circuit 110 is connected to a suitable source of a reference signal $S_m$ representative of a first predetermined voltage level and, likewise, the negative input terminal of the fourth comparator circuit 112 is connected to a suitable source of a reference signal $S_n$ representative of a second predetermined voltage level higher than the first predetermined voltage level. The negative input terminal of the third comparator circuit 110 and the positive input terminal of the fourth comparator circuit 112 are connected in parallel to the signal pick-up unit 24 (FIG. 6) through the line 44 so as to be supplied with the tracking error signal $S_c$. The third comparator circuit 110 is thus operative to compare the tracking error signal $S_c$ with the reference signal $S_m$ and to produce a square-shaped pulse signal $S_3$ having a logic "1" level when, for example, the envelope signal $S_b$ is lower in magnitude than the reference signal $S_m$. Likewise, the fourth comparator circuit 112 is operative to compare the tracking error signal $S_c$ with the reference signal $S_n$ and to produce a square-shaped pulse signal $S_4$ having a logic "1" level when, for example, the tracking error signal $S_c$ is higher in magnitude than the reference signal $S_n$. The third and fourth comparator circuits 110 and 112 thus constitute in combination polarity detecting means adapted to determine the polarity of the signal $S_c$ when the focused spot $B_1$ (FIG. 2) of the information pick-up beam is located in the vicinity of the crosswise boundaries of the individual recorded tracks on the video disc 20.

In the circuit arrangement illustrated in FIG. 8, the switch means 86 in the velocity control device described with reference to FIG. 6 comprises the combination of first and second delayed flip-flop circuits 114 and 116 (D-FF) each having a clear terminal (C) as well as a clock terminal (CK) and a data input terminal (D). The first delayed flip-flop circuit 114 has its data and clock input terminals connected to the output terminals of the first and third comparator circuits 96 and 110, respectively, of the switch control circuit 84 while the second delayed flip-flop circuit 116 has its data input and clock terminals connected to the output terminals of the first and fourth comparator circuits 96 and 112, respectively, of the switch control circuit 84. The respective clear terminals of the first and second delayed flip-flop circuits 114 and 116 are connected jointly to the inverted output terminal $\overline{Q}$ of the delayed flip-flop circuit 104 of the switch control circuit 84. Each of the first and second delayed flip-flop circuits 114 and 116 is thus adapted to be reset in the presence of a pulse signal $S_e$ of the logic "1" level at the inverted output terminal $\overline{Q}$ of the delayed flip-flop circuit 104. In the absence of a pulse signal $S_e$ of the logic "1" level at the inverted output terminal $\overline{Q}$ of the delayed flip-flop circuit 104, the first and second delayed flip-flop circuits 114 and 116 are thus conditioned to pass therethrough the switch control circuit 84. Thus, either the first delayed flip-flop circuit 114 or the second delayed flip-flop circuit 116 is conditioned to produce the output signal $S_3'$ or $S_4'$ of the logic "1" level at the non-inverted output terminal $Q$ depending upon the direction of movement of the signal pick-up unit 24 with respect to the video disc 20 when the pick-up unit 24 is being moved from a position in which the center point of the focused spot $B_1$ (FIG. 2) of the predetermined is located at the lateral center point of a recorded track on the video disc 20 to a position in which the center point of the focused spot $B_1$ of the predetermined is located at the center point between the particular recorded track and an adjacent recorded track on the video disc 20 (FIG. 6).

The non-inverted output terminals $Q$ of the first and second delayed flip-flop circuits of the switch means 86 thus constructed and operative are connected to the trigger terminals of first and second monostable multivibrator circuits 118 and 120 (MMV), respectively, having output terminals connected to the differential amplifier circuit 86 previously described with reference to FIG. 6. Either the first monostable multivibrator circuit 118 or the second monostable multivibrator circuit 120 is thus triggered and, as a consequence, one of the input terminals of the differential amplifier circuit 86 is supplied with a train of pulse signals with a repetition rate variable with the frequency of the envelope signal $S_b$ from the monostable multivibrator circuit 118 or 120 depending upon the direction of movement of the signal pick-up unit 24 with respect to the video disc 20. A train of positive or negative pulse signals is thus delivered from the output terminal of the differential amplifier circuit 86 to a low-pass filter 122 (LPF) and is thereby smoothed into an output signal having a voltage level variable with the velocity of the signal pick-up unit 24 with respect to the video disc 20 (FIG. 6) and a polarity corresponding to the direction of movement of the pick-up unit 24. Though not shown in FIG. 8, the output terminal of the low-pass filter 122 is connected through a driving amplifier 54 to the current-carrying coil of the movable armature unit 36 of a linear-motion drive assembly 32 as shown in FIG. 6.

Figure 10A:
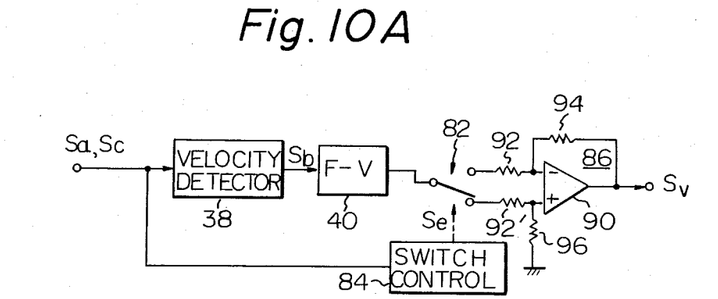
FIG. 10A is a schematic diagram showing the circuit arrangement of a modification of the emodiment shown in FIG. 1.
Figure 10B:
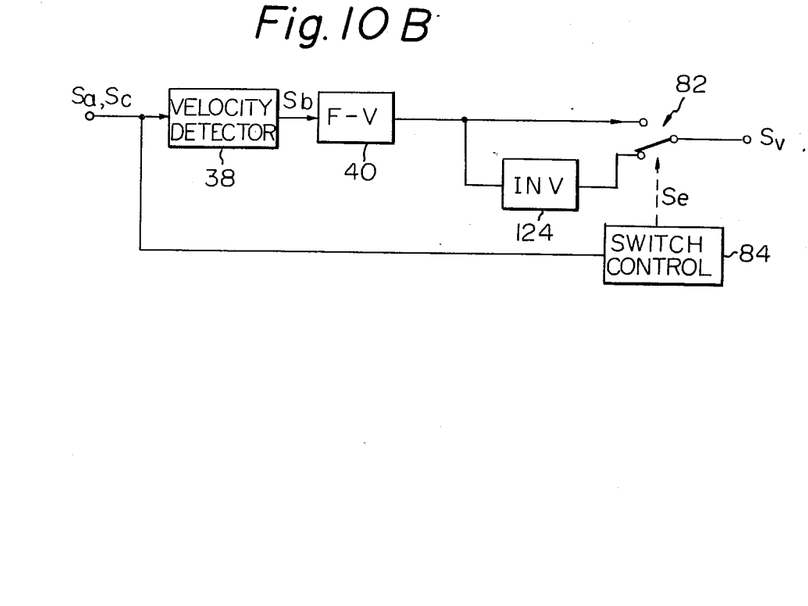
FIG. 10B is a diagram similar to FIG. 10A but shows another modification of the embodiment shown in FIG. 1.

FIGS. 10A and 10B of the drawings show other modifications of the embodiment described with reference to FIG. 1. In the embodiment shown in FIG. 10A, switch means 82 is provided between the frequency-to-voltage converter circuit 40 (F-V) and a differential amplifier circuit 86 and is controlled by a switch control circuit 84 similar to its counterpart in the embodiment of FIG. 6. The differential amplifier circuit 86 serving as polarity discriminating means is composed of an operational amplifier circuit 90 having negative and positive input terminals connected through resistors 92 and 92' to the output terminal of the frequency-to-voltage converter circuit 40 across the above mentioned switch means 86 and a feedback resistor 94 connected between the output terminal and the negative input terminal of the operational amplifier circuit 90. Though not shown in FIG. 10A, the output terminal of the differential amplifier circuit 86 thus constructed and arranged is connected through a subtractive comparator circuit 42 and a driving amplifier 54 to the current-carrying coil of the movable armature unit 36 of a linear-motion drive assembly 32 as described with reference to FIGS. 1 and 6. On the other hand, the the embodiment shown in FIG. 10B has provided therein switch means 82 having input terminals connected to the output terminal of the frequency-to-voltage converter circuit 40 (F-V), one directly and the other through an inverter circuit 124 (INV) as shown. The inverter circuit 124 and the connection between the switch means 86 and the frequency-to-voltage converter circuit 40 constitute, in combination, polarity discriminating means. The switch means 82 in the embodiment shown in FIG. 10B is also controlled by a switch control circuit 84 similar to its counterpart in the embodiment of FIG. 6.

Figure 11:
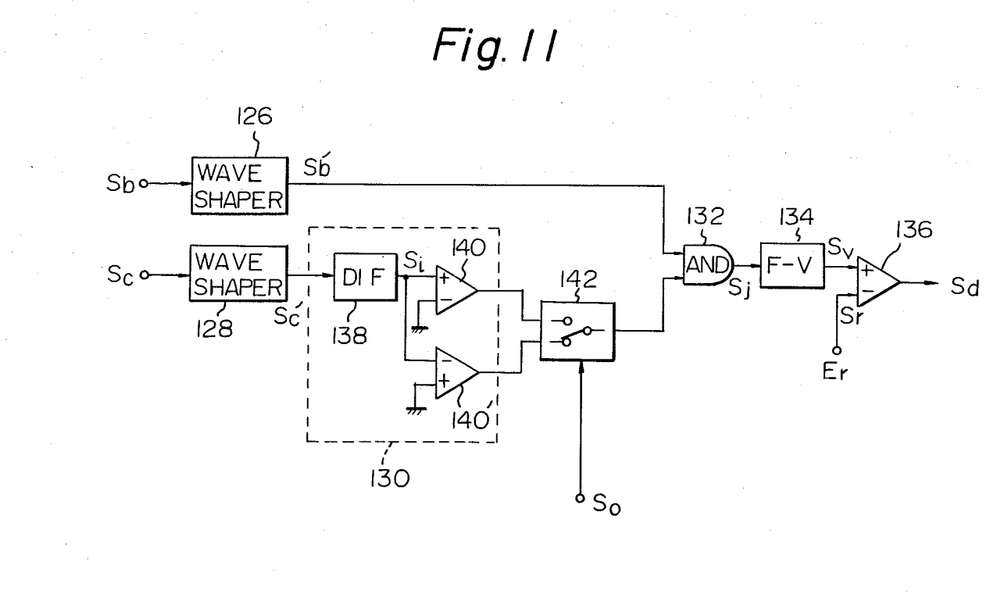
FIG. 11 is a schematic diagram showing the circuit arrangement of still another preferred embodiment of the velocity control device according to the present invention.
Figure 12:
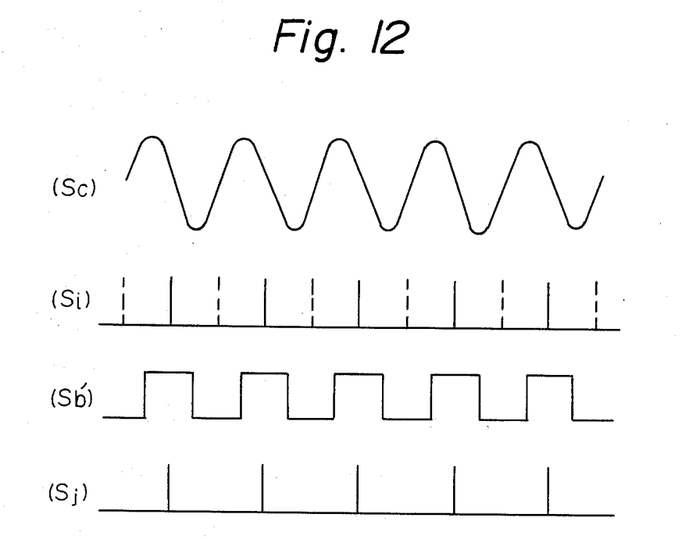
FIG. 12 is a graph showing waveforms of signals produced in the circuit arrangement shown in FIG. 11.

FIG. 11 of the drawings shows another preferred embodiment of the present invention. The embodiment herein shown comprises first and second wave shaping circuits, an edge detecting circuit 130, a two-input logic "AND" gate circuit 132, a frequency-to-voltage converter circuit 134 (F-V) and a subtractive comparator circuit 136. The first wave shaping circuit 126 has an output terminal connected to one input terminal of the edge detecting circuit 130 and an input terminal connected to the output terminal of a velocity detecting circuit 38 (FIG. 1) so as to be supplied with the envelope signal $S_b$. The second wave shaping circuit 128 has an output terminal connected to the other input terminal of the logic "AND" gate circuit 132 through the edge detecting circuit 130 and an input terminal connected to the signal pick-up unit 24 (FIG. 1) so as to be supplied with the tracking error signal $S_c$. The first wave shaping circuit 126 is operative to convert the envelope signal $S_b$ into a square-shaped pulse signal $S_b'$ in phase with the signal $S_b$ as shown in FIG. 12 and to supply the pulse signal $S_b'$ to one input terminal of the logic "AND" gate circuit 132. Likewise, the second wave shaping circuit 128 is operative to convert the tracking error signal $S_c$ into a square-shaped pulse signal $S_c'$ in phase with the signal $S_c$ and to supply the pulse signal $S_c'$ to the edge detecting circuit 130. The edge detecting circuit 130 is composed of a differentiating circuit 138 (DIF), a parallel combination of first and second comparator circuits 140 and 140', and a switching circuit 142. The differentiating circuit 138 has an input terminal connected to the output terminal of the second wave shaping circuit 128 and is adapted to produce a series of alternately positive and negative impulse signals $S_i$ in response to leading and trailing edges, respectively, of the pulse signal $S_c'$ from the second wave-shaper as shown in FIG. 12. The first comparator circuit 140 has a positive input terminal connected to the output terminal of the differentiating circuit 138 and a negative input terminal grounded or otherwise connected to a source of a zero volt signal and is adapted to pass therethrough the positive (indicated by full lines in FIG. 12) ones of the impulse signals $S_i$ delivered from the differentiating circuit 138. On the other hand, the second comparator circuit 140' has a negative input terminal connected to the output terminal of the differentiating circuit 138 and a positive input terminal grounded or otherwise connected to a source of a zero volt signal and is adapted to pass therethrough the negative ones (indicated by broken lines in FIG. 12) of the impulse signals $S_i$ delivered from the differentiating circuit 138. Thus, the first and second comparator circuits 140 and 140' constitute in combination separating means operative to separate the positive ones and negative ones of the impulse signals $S_i$. The positive and negative impulse signals $S_i$ thus separated by the comparator circuits 140 and 140' are indicative of the leading and trailing edges, respectively, of the pulse signal $S_c'$ supplied from the second wave shaping circuit 128 and are delivered from the first and second comparator circuits 140 and 140' at timings when the focused spot $B_1$ (FIG. 2) of the information pick-up beam displaced radially of the video disc 20 (FIG. 1) is located correctly on the lateral center point of a recorded track or on the center point between any two adjacent recorded tracks on the video disc 20. Such impulse signals $S_i$ are fed to the switching circuit 142 having two input terminals connected to the respective output terminals of the first and second comparator circuits 140 and 140' and an output terminal connected to the above mentioned logic "AND" gate circuit 132. The switching circuit 142 is operable between a condition providing connection between the output terminal of one of the comparator circuits 140 and 140' and the logic "AND" gate circuit 132 and a condition providing connection between the output terminal of the other of the comparator circuits and the logic "AND" gate circuit 132. The switching circuit 142 is controlled to shift between these two conditions by an external control signal So indicative of the direction of movement of the signal pick-up unit 24 with respect to the video disc 20 (FIG. 2) and is operative to pass therethrough only the positive ones or the negative ones of the impulse signals $S_i$ fed to the input terminals thereof.

Figure 13:
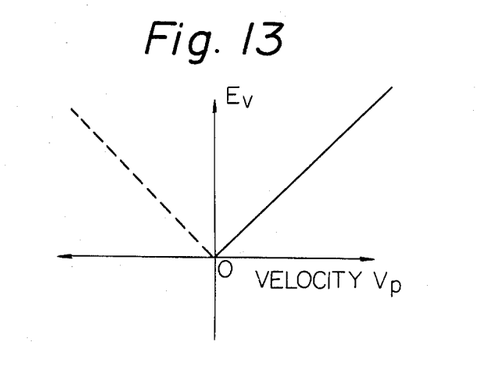
FIG. 13 is a graph showing the control characteristics achieved by the velocity control device shown in FIG. 11.

The logic "AND" gate circuit 132 produces a series of impulse signals $S_j$ of a logic "1" level in response to the square-shaped pulse signal $S_b'$ supplied from the first wave shaping circuit 126 and the positive or negative impulse signals $S_i$ supplied from the first or second comparator circuit 140 or 140' through the switching circuit 142 as described above. The impulse signals $S_j$ are thus supplied from the logic "AND" gate circuit 132 with a frequency variable with the frequency of the original envelope signal $S_b$ or tracking error signal $S_c$ and at timings when the focused spot $B_1$ of the information pick-up beam is located correctly at the center point of a recorded track or the center point between any adjacent two recorded tracks on the video disc 20. The impulse signals $S_j$ delivered from the logic "AND" gate circuit 132 in the above described manner are fed to the frequency-to-voltage converter circuit 134 and are converted into a voltage signal $S_v$ having a voltage level $E_v$ proportional to the repetition frequency of the impulse signals $S_j$ or, in other words, variable with the velocity of movement of the signal pick-up unit 24 with respect to the video disc 20 (FIG. 1) as indicated in FIG. 13 of the drawings. The voltage signal $S_v$ thus produced by the frequency-to-voltage converter circuit 134 is fed to the subtractive comparator circuit 136 having a positive input terminal connected to the output terminal of the frequency-to-voltage converter circuit 134 and a negative input terminal connected to a suitable source (not shown) of a reference signal $S_r$ representative of a predetermined positive voltage $E_r$. The subtractive comparator circuit 136 is operative to compare the input signal $S_v$ with the reference signal $S_r$ and to produce an output signal $S_d$ when the former is higher in magnitude than the latter. The output signal $S_d$ is supplied through a driving amplifier circuit (not shown) to the current-carrying coil of the armature unit 36 of the linear-motion drive assembly 32.

What is claimed is:

1. A pick-up device positioning arrangement for controlling a radial position of a pick-up device with respect to a turn-table in an information disc player, said pick-up device having a pick-up point to be aligned onto a target track of a disc mounted on said turn-table under control of a tracking servo system which operates in accordance with a tracking error signal representative of an amount of deviation of said pick-up point from said target track, said pick-up device producing an information signal, the improvement which comprises:

an envelope detector for producing an envelope frequency of said information signal;

a frequency to voltage converter means connected to said envelope detector, for producing a detection signal representative of the envelope frequency; and drive means for driving said pick-up device for relative movement radially of said disc at a velocity according to said detection signal.

2. A pick-up device positioning arrangement for controlling a radial position of a pick-up device with respect to a turn-table in an information disc player, said pick-up device having a pick-up point to be aligned onto a target track of a disc mounted on said turn-table under control of a tracking servo system which operates in accordance with a tracking error signal representative of an amount of deviation of said pick-up point from said target track, the improvement which comprises:

a frequency to voltage converter means for producing a detection signal representative of the frequency of said tracking error signal; and drive means for driving said pick-up device for relative movement radially of said disc at a velocity according to said detection signal.

3. The improvement as claimed in claim 1 or 2, in which said frequency-to-voltage converter means produces a voltage signal variable with the magnitude of the frequency of the signal input thereto; and said drive means includes a reference voltage source for producing a reference voltage representative of a predetermined velocity of movement of said pick-up device; a subtractive comparator for producing a power voltage representative of a difference between said voltage signal and said reference voltage; and an actuator for moving said pick-up device radially with respect to said disc at a velocity according to said power voltage.

4. A pick-up device positioning arrangement for controlling a radial position of a pick-up device with respect to a turn-table in an information disc player, said pick-up device having a pick-up point to be aligned onto a target track of a disc mounted on said turn-table under control of a tracking error signal generated by a tracking servo system, said tracking error signal representative of amount of deviation of said pick-up point from said target track, said pick-up device generating an information signal, the improvement which comprises:

an envelope detector for producing an envelope frequency of said information signal;

a frequency to voltage converter means for producing a first detection signal representative of said envelope frequency;

a movement direction detector for producing a second detector signal representative of the movement direction of said pick-up device by comparing in phase said envelope frequency and said tracking error signal;

a voltage generator for producing a drive voltage having a magnitude according to said first detection signal and a polarity according to said second detection signal; and, a drive means for driving said pick-up device for relative movement radially with respect to said disc at a velocity according to said drive voltage.

5. A pick-up device positioning arrangement for controlling a radial position of a pick-up device with respect to a turn-table in an information disc player, said pick-up device having a pick-up point to be aligned onto a target track of a disc mounted on said turn-table under control of a tracking error signal generated by a tracking servo system, said tracking error signal representative of amount of deviation of said pick-up point from said target track, said pick-up device generating an information signal, the improvement which comprises:

an envelope detector for producing an envelope frequency from said information signal;

a frequency to voltage converter means for producing a first detection signal representative of the frequency of said tracking error signal;

a movement direction detector for producing a second detector signal representative of the movement direction of said pick-up device by comparing in phase said envelope frequency and said tracking error signal;

a voltage generator for producing a drive voltage having a magnitude according to said first detection signal and a polarity according to said second detection signal; and, drive means for driving said pick-up device for relative movement radially with respect to said disc at a velocity according to said drive voltage.

6. The improvement as defined by claims 4 or 5, in which said drive means includes a reference voltage source for producing a reference voltage representative of a predetermined velocity of movement of said pick-up device; a subtractive comparator for producing a power voltage representative of a difference between said voltage signal and said reference voltage; and an actuator for moving said pick-up device radially with respect to said disc at a velocity according to said power voltage.

7. The improvement as defined by claim 4, in which said frequency to voltage converter means includes a pair of frequency-to-voltage converters which respectively produces voltage signals variable with the frequency of signals input thereto; and said voltage generator includes a change-over switch which relays said envelope frequency to either one of said frequency-to-voltage converters in accordance with said second detection signal; and an operational amplifier having inverting and non-inverting input terminals respectively connected to the output terminals of said frequency-to-voltage converters.

8. The improvement as defined by claim 5, in which said frequency to voltage converter means includes a pair of frequency-to-voltage converters which respectively produces voltage signals variable with the frequency of input signals thereto; and said voltage generator includes a change-over switch which relays said tracking error signal to either one of said frequency-to-voltage converter in accordance with said second detection signal; and an operational amplifier having inverting and non-inverting input terminals thereof respectively connected to the output terminals of said frequency-to-voltage converters.

9. The improvement as defined by claim 4 or 5, in which said frequency to voltage converter means produces a voltage signal variable with the frequency of the signal input thereto; and said voltage generator includes an operational amplifier having inverting and non-inverting input terminals and a change-over switch which relays said voltage signal to either one of inverting and non-inverting input terminals of said operational amplifier in accordance with said second detection signal.

10. The improvement as defined by claims 4 or 5, in which said frequency to voltage converter means produces a voltage signal variable with the frequency of the signal input thereto; and said voltage generator includes an inverter for inverting the phase of said voltage signal and a change-over switch which relays either one of the output signals from said frequency-to-voltage converter and said inverter in accordance with said second detection signal.

11. The improvement as defined by claims 4 or 5, in which said movement direction detector is adapted to the detect phase difference between said envelope frequency and said tracking error signal.

12. The improvement as defined by claim 11, in which said movement direction detector includes:
- a zero-cross point detector for producing zero-cross point pulses each appearing at zero-cross point of said tracking error signal; and,
- a pulse generator for producing clear pulses each having a leading edge at a zero-cross point pulse appearing during a one level of said envelope frequency and trailing edge at a zero-cross point pulse appearing during the other level of said envelope frequency.

13. The improvement as defined by claim 12, in which said voltage generator includes:
- a first tracking pulse generator for producing first pulses each having pulse width lasting during lower level of said tracking error signal;
- a second tracking pulse generator for producing second pulses each lasting during a higher level of said tracking error signal;
- a first gate for producing a first gate pulse when each of said first pulses is different in phase from each of said clear pulses;
- a second gate for producing a second gate pulse when each of said second pulses is different in phase from each of said clear pulses;
- a pair of monostable multivibrators for respectively producing trigger pulses in response to said first and second gate pulses;
- an operational amplifier having inverting and non-inverting input terminals respectively connected to the respective output terminals of said monostable multivibrators; and,
- a low pass filter for producing a smoothed voltage in response to an output signal from said operational amplifier.

14. A pick-up device positioning arrangement for controlling a radial position of a pick-up device with respect to a turn-table in an information disc player, said pick-up device having a pick-up point to be aligned onto a target track of an information disc mounted on said turn-table under control of a tracking error signal generated by a tracking servo system, said tracking error signal representative of an amount of deviation of said pick-up point from said target track, means for generating an external control signal indicative of the direction of movement of said pick-up device with respect to said information disc, said pick-up device generating an information signal; the improvement which comprises:
- an envelope detector for producing an envelope frequency of said information signal;
- a first wave-shaper for producing a first pulse signal corresponding to said envelope frequency;
- a second wave-shaper for producing a second pulse signal corresponding to said tracking error signal;
- an edge detector for producing first and second edge pulse trains, said first edge pulse train including first edge pulses each appearing at the leading edge of each pulse of said second pulse signal, and said second edge pulse train including second edge pulses each appearing at the trailing edge of pulses of said second pulse signal;
- a change-over switch for selectively passing therethrough either one of said first and second edge pulse trains in accordance with said external control signal;
- an AND gate for passing therethrough the pulses from said change-over switch when said first pulse signal takes either one level;
- a frequency to voltage converter means for producing a detection signal representative of the frequency of said pulses passed through said AND gate; and
- drive means for driving said pick-up device at a velocity according to said detection signal.

* * * * *